July 3, 1951      H. E. WIGGIN      2,559,240
DUNNAGING DEVICE
Filed Feb. 9, 1946
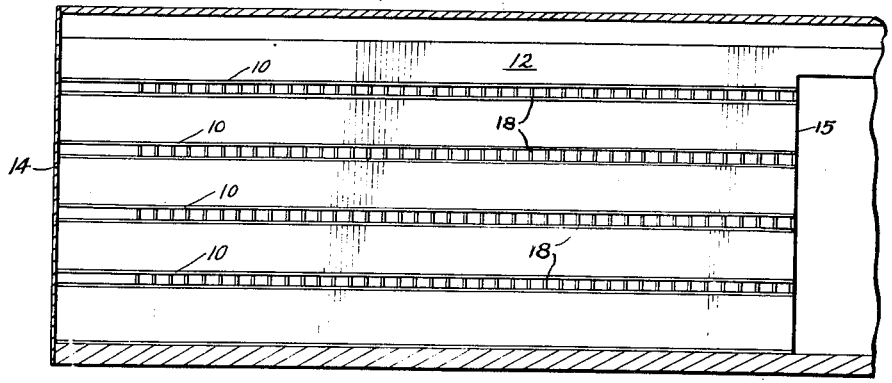
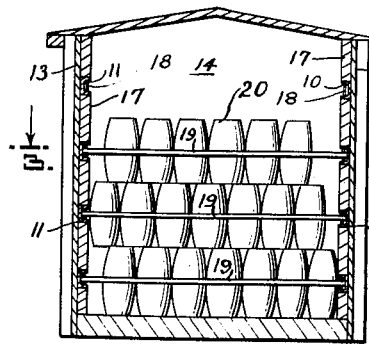
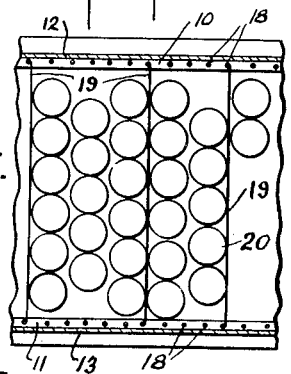
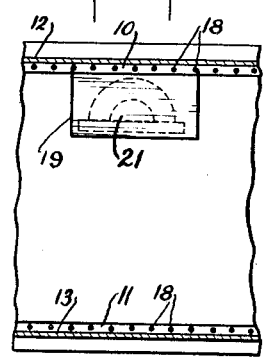
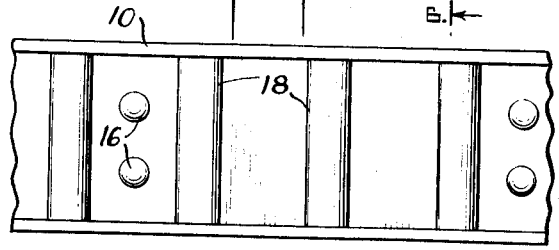
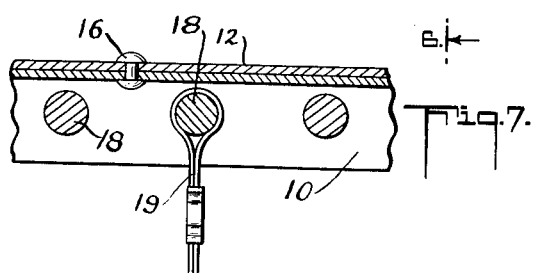
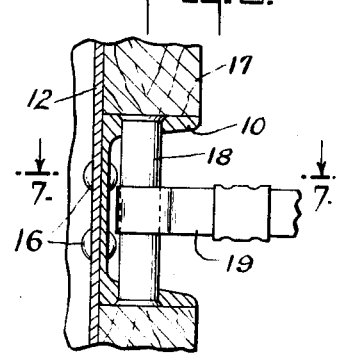
INVENTOR
HERBERT E. WIGGIN
BY Henry J. Savage
ATTORNEY Patented July 3, 1951

2,559,240

UNITED STATES PATENT OFFICE 2,559,240

DUNNAGING DEVICE

Herbert E. Wiggin, Englewood, N. J.

Application February 9, 1946, Serial No. 646,510

4 Claims. (Cl. 105—369)

My invention pertains to dunnaging devices and has for its principal object to provide means for preventing the shifting of loads or partial loads within or on vehicles, including freight cars, trucks, barges, ships, airplanes, skids and other means of transportation.

Another object is to provide means whereby the load in a vehicle may be divided or separated into sections or lots that are to be shipped to different points or to different consignees, and the separate lots may be unloaded in turn at their respective destinations without disturbing the remaining ones.

Another object is to provide means for restraining merchandise against movement within or on a vehicle that would cause damage during transit or throw the vehicle out of trim, whether the vehicle be fully or partly loaded.

Still another object is to provide means preventing crushing or damage to goods in transit due to the inertia of the load upon sudden changes in speed or direction of travel of the vehicle.

Another important object is to provide means for preventing damage to merchandise while in transit, which means is cheap and easy to apply, easy to remove, prevents damage to the vehicle as well as to the merchandise, and yet affords equal or better protection than devices heretofore used.

Yet another object is to provide a dunnaging device that may be built in and form a part of the frame of the vehicle and will leave the walls and floor free from projections or protuberances.

Another object is to provide a dunnaging device that will facilitate dunnaging of the load in a vehicle and greatly prolong its life by obviating the necessity for nailing, bolting or otherwise securing braces, cleats, struts, bars or timbers to the side walls or floor.

Another object is to provide a dunnaging device that may be used to secure a single object, as a machine, against movement within a car and is equally effective in securing all or any part of a load made up of boxes, parcels and crates of different sizes and shapes.

Another object is to provide a dunnaging device that can be used for preventing shifting of the load within a vehicle, as a freight car, and also affords an anchorage for merchandise loaded between or in front of the doors.

The above and other objects and advantages are attained by my invention, one embodiment of which I have illustrated in the accompanying drawings.

Fig. 1 is a vertical longitudinal section of one end of a freight car having my invention embodied therein.

Fig. 2 is a cross section of a loaded car, the section being indicated by the line 2—2 on Fig. 1.

Fig. 3 is a fragmentary plan view in section, as indicated by line 3—3 on Fig. 2.

Fig. 4 is a section similar to Fig. 3, showing how a single article, as a machine, may be secured against a wall or the floor of a car.

Fig. 5 is a detail view of the side rails.

Fig. 6 is a section on line 6—6 of Fig. 5 with one end of a dunnaging strap secured to one of the pins.

Fig. 7 is a section on line 7—7 of Fig. 6.

In the drawings I have shown my invention applied to a box type freight car, but this is for purposes of illustration only because the invention is equally applicable to any vehicle such as flat cars, trucks, barges, ships, skids and airplanes that may be used for transporting freight.

Opposite bars or channels 10, 11 are secured to the sides 12, 13 of the car and preferably extend from the opposite ends 14 to the doorway 15. The channels are secured to the sides of the car by suitable securing means such as the rivets 16 shown in Figs. 5, 6 and 7, or by welding when the sides of the car are metal, but bolts or screws may be used in certain cases. When secured to the side walls of the car the channels 10, 11 serve to strengthen the car and may be part of the car frame.

The channels are secured in the car with their backs toward the wall and their open flanges facing toward the inside of the car. The inner edges of the flanges are substantially flush with the car sheathing 17, so that the inner walls are smooth and free from projections. The inside faces of the flanges are inclined with respect to the outer edges so that when a car of bulk material, as grain, is being unloaded, all of the material will flow away and there will be no accumulation within the channels. Instead of using standard light channels, as I have illustrated, I may use special pressed channels with the slope of the flanges increased.

Each channel has a number of pins 18 secured in the two flanges and spaced apart a suitable distance so that ample selective means will be available for securing ties to hold the load in position at any desired point. I have found three or four inch spacing of the pins to be satisfactory, but other spacing can be used.

When the vehicle is designed for general use there usually will be three or four channels on each side which run the full length of the vehicle except for the door opening. However, in the case of ships or other large vehicles, the number of channels may be increased and in the case of small trucks, skids and airplanes, the number may be fewer.

A number of ties 19 are secured to opposite pins in the channels at proper points to prevent the load or parts of the load from shifting. These ties preferably are steel bands, the opposite end of which are passed around and secured to pins in opposite channels. Instead of steel bands these may be any flexible means or they may be rigid members, as bars or gates, with special securing means at each end adapted to engage the respective pins.

In Figs. 2 and 3, I show how the steel bands 19 may be stretched across the car to prevent shifting of the load. In loading the car, loading will begin at one end and if the car is to contain several drop shipments or different consignments, bands will be stretched across when one shipment has been stacked in the car, then another lot or shipment will be loaded and bands stretched across to hold the second lot and this process continued until the entire car is loaded.

In Figs. 2 and 3, I have shown the load as made up of barrels 20, but this is for purposes of illustration only. The invention is adapted for holding boxes, crates, barrels, machinery or other objects against shifting regardless of size or shape or method of packing.

When it is desired to separate small parts of the lading or to secure individual component parts, as for example a machine, one or more bands 19 will be drawn tightly about the machine 21 with both ends of each band secured to pins 18 in a single channel so as to hold the machine or part load securely against one side, an end, or the floor of the vehicle as shown in Fig. 4.

The pins 18 preferably are quite close together so that bands can be stretched across the car or around an object at any point to hold merchandise of any size or shape.

It will be apparent that my invention provides a cheap, efficient and flexible means for securing objects of all sizes, shapes and quantities against shifting and damage while in transit.

Having thus described one embodiment of my invention I claim all equivalents and modifications thereof that may come within the scope or terms of my claims.

I claim:

1. A dunnaging device for a vehicle, comprising U-shaped channels arranged to extend lengthwise along opposite sides of the vehicle, a plurality of pins extending between and having their opposite ends secured to the opposed flange portions of each channel and being located in spaced relation to one another and to the back wall of the channel, and a tie member extending across the vehicle and fastened to pins in each channel.

2. A dunnaging device for a vehicle equipped with an enclosed body, comprising a plurality of opposed U-shaped channels arranged to extend in parallel lengthwise along opposite walls of the body, the channels being disposed so as to open inwardly of the body with the ends of the flange portions thereof flush with the inner surface of the respective wall, a plurality of pins extending vertically between and having their opposite ends secured to the flange portions of each channel, said pins being arranged in each channel in spaced relation to one another and to the back wall of the channel, and a flexible tie member extending across the body between opposed channels and fastened to pins therein.

3. In or for a dunnaging device for a vehicle, a channel member formed to be secured to the vehicle and comprising a back wall having opposed flanges extending therefrom in spaced apart relation, and a plurality of pins extending between and having their opposite ends secured to the flanges, said pins being located in spaced relation to one another and to the back wall of the channel, whereby the pins form a series of anchors to which a tie member may be selectively anchored.

4. A dunnaging device for vehicle equipped with an enclosed body, comprising opposed members substantially coextensive lengthwise with opposite walls of the body and presenting each throughout its length a smooth continuous surface exposed to the interior of the body, and a plurality of vertically disposed pins having their opposite ends secured to said member arranged in horizontal alignment in spaced apart relation to one another and to said surface, whereby a flexible tie member may be extended across the body and fastened to a pin on each opposed member or threaded between a selected series of the pins and said surface of the respective member and fastened to the end pin of said series.

HERBERT E. WIGGIN.

REFERENCES CITED

The following references are of record in the file of this patent:

UNITED STATES PATENTS

| Number | Name | Date |
|---|---|---|
| 994,822 | Daly | June 13, 1911 |
| 1,973,624 | Hanlon | Sept. 11, 1934 |
| 2,052,914 | Williams | Sept. 1, 1936 |
| 2,226,667 | Love | Dec. 31, 1940 |
| 2,354,861 | Hermann | Aug. 1, 1944 |